United States Patent [19]
Nicholls et al.

[11] Patent Number: 5,139,550
[45] Date of Patent: Aug. 18, 1992

[54] METHOD OF MAKING FLUORIDE GLASS OPTICAL COUPLER

[75] Inventors: Simon T. Nicholls, Woodbridge; Michael Scott, Needham Market, both of England

[73] Assignee: British Telecommunications public limited company, London, England

[21] Appl. No.: 601,703
[22] PCT Filed: May 5, 1989
[86] PCT No.: PCT/GB89/00480
§ 371 Date: Oct. 30, 1990
§ 102(e) Date: Oct. 30, 1990
[87] PCT Pub. No.: WO89/10901
PCT Pub. Date: Nov. 16, 1989

[30] Foreign Application Priority Data
May 9, 1988 [GB] United Kingdom ............... 8810907

[51] Int. Cl.$^5$ .............................................. C03B 23/20
[52] U.S. Cl. ............................................ 65/4.2; 65/29; 65/DIG. 16; 65/4.3; 385/51
[58] Field of Search ................ 65/2, 3.11, 3.2, 4.2, 65/4.21, 4.3, 12, 109, 110, 157, 292, 374.15, DIG. 16, 29; 350/96.15; 385/15, 39, 51

[56] References Cited

U.S. PATENT DOCUMENTS

| | | | |
|---|---|---|---|
| 3,579,316 | 5/1971 | Dyott et al. | 65/4.2 |
| 4,291,940 | 9/1981 | Kawasaki et al. | 65/4.2 |
| 4,336,047 | 5/1982 | Pavlopoulos et al. | 65/3.31 |
| 4,377,403 | 3/1983 | McLandrich | 65/4.21 |
| 4,392,712 | 7/1983 | Ozeki | 350/96.15 |
| 4,410,346 | 10/1983 | Aulich et al. | 65/4.2 |
| 4,426,215 | 1/1984 | Murphy | 65/4.21 |
| 4,439,221 | 3/1984 | Smyth et al. | 65/4.21 |
| 4,449,781 | 5/1984 | Lightstone et al. | 350/96.15 |
| 4,591,372 | 5/1986 | Bricheno et al. | 65/4.2 |
| 4,630,890 | 12/1986 | Ashkin et al. | 350/96.33 |
| 4,652,288 | 3/1987 | Saito | 65/DIG. 16 |
| 4,659,355 | 4/1987 | Maze et al. | 65/3.12 |
| 4,704,151 | 11/1987 | Keck | 65/4.1 |
| 4,750,926 | 6/1988 | Berkey | 65/2 |
| 4,773,924 | 9/1988 | Berkey | 65/4.2 |
| 4,799,949 | 1/1989 | Keck et al. | 65/4.2 |
| 4,923,268 | 5/1990 | Xu | 350/96.15 |

FOREIGN PATENT DOCUMENTS

| | | |
|---|---|---|
| 0093460 | 11/1983 | European Pat. Off. |
| 170380 | 2/1986 | European Pat. Off. |
| 0174014 | 3/1986 | European Pat. Off. |
| 2587502 | 3/1987 | France |
| 57-014801 | 1/1982 | Japan |
| 58-91403 | 5/1983 | Japan |
| 59-195615 | 11/1984 | Japan |
| 62-69206 | 3/1987 | Japan |

OTHER PUBLICATIONS

Dyott et al., Polarization Holding Directional Couplers Using D Fiber SPIE, vol. 479, (1984) pp. 23-27.

Primary Examiner—W. Gary Jones
Assistant Examiner—John J. Bruckner
Attorney, Agent, or Firm—Nixon & Vanderhye

[57] ABSTRACT

A fused coupler is formed from two twisted optic fibers (2, 3) of fluoride glass by heating them in the slot (18) of a temperature-controlled heater (15) in a shroud (14) containing an oxygen-free atmosphere. The glass of the fibers may be ZBLAN glass in which case the temperature is 323° C. ± 10° C. In an alternative embodiment the shroud is dispensed with and inert gas (nitrogen) is injected into a hole in the slot (18).

19 Claims, 2 Drawing Sheets

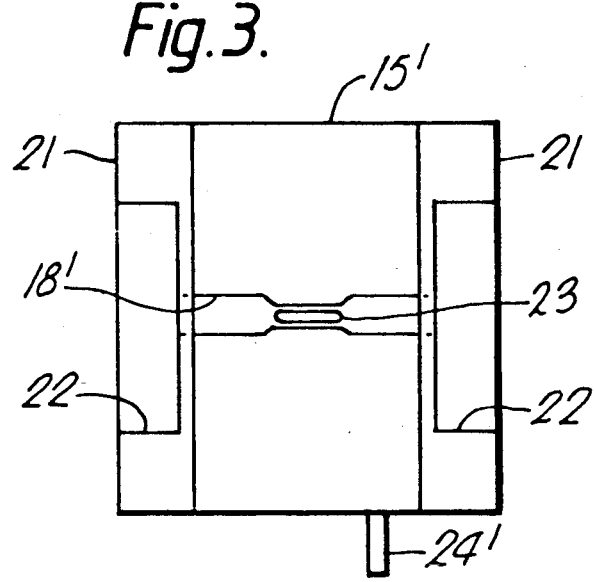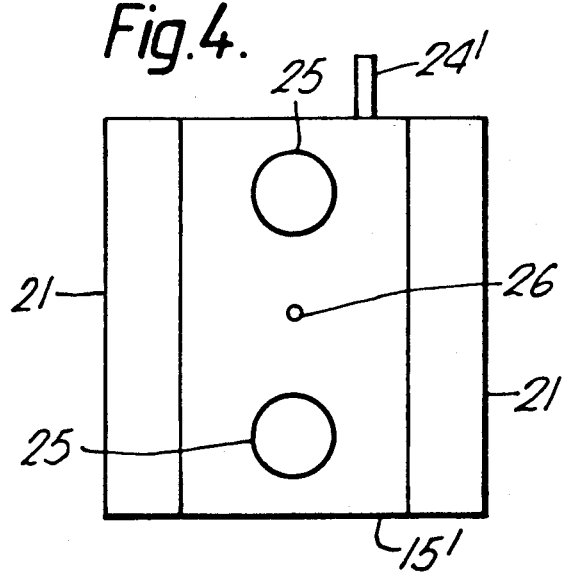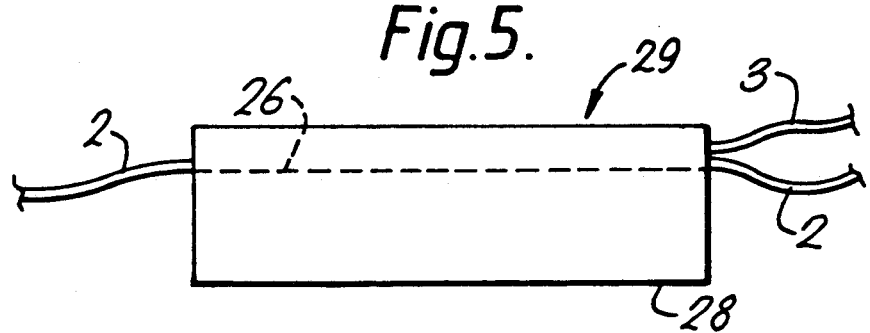

METHOD OF MAKING FLUORIDE GLASS OPTICAL COUPLER

The present invention relates to optical couplers formed from optic fibres composed of fluoride glass. Fluoride type glasses, normally containing fluorozirconate (ZrF4) and optic fibres formed form such glasses are disclosed in Br Telecom Technol J Vol 5 No 2 April 1987 "Progress in Fluoride Fibres for Optical Communications"—P W France et al and in a paper entitled "Properties of Fluorozirconate Fibres for Applications in the 0.5 to 4.5 Micrometer Region" by P W France et al which was presented at the SPIE Conference at San Diego in August 1987. Such fluoride fibres are the subject of European Patent Application No 85304280.2 (Publication No 170380). These three documents are incorporated herein by reference and it is to be understood that the term "fluoride glass" includes but is not limited to all the fluoride-containing glasses described in the above papers and all the fluoride glasses having anions that are fluoride ions (F).

The main advantage of optic fibres composed of fluoride glass is their increased bandwidth which results in transmission in the far infra-red portion of the spectrum. Although such optic fibres are likely to have future applications in telecommunications, their most important use presently is in optical fibre sensors. For long term stability of the measurements of such sensors there is a need to monitor input power to the sensor for use as a reference, and this is only possible using a directional coupler of some description. There is also a need for optical couplers for fluoride optic fibres in order to enable the power of one laser to be split between a number of sensors, particularly in view of the high cost of the lasers used in such applications.

It is known to form optical couplers from two or more optic fibres by disposing the optic fibres across one another so as to bring their claddings into contact, and tensioning and heating the optic fibres so as to fuse together at least the contacting portions of their claddings. Hitherto, such a method has been applied to conventional silica optic fibres which have a relatively wide usable viscosity range between their glass transmission temperature Tg and their crystallisation temperature Tx which enables the fibre claddings to be fused to an appropriate degree without difficulty. However typical fluoride glasses such as ZBLAN glass can be drawn only over a relatively narrow temperature range as disclosed in FIG. 3 of the Br Telecom Technol J article referred to above. We have found that even when it is attempted to fuse optic fibres of fluoride glass within this narrow temperature range of typically 20° C., considerable difficulties arise. We believe that such difficulties arise from the crystallisation of the glass which is induced by oxygen in the air even at temperatures significantly below the crystallisation temperature Tx.

The present invention provides a method of forming an optical coupler from two or more optic fibres comprising disposing the optic fibres across one another so as to bring their claddings into contact, and tensioning and heating the optic fibres so as to fuse together at least the contacting portions of their claddings, characterised in that the optic fibres are composed of a fluoride glass and are heated in an oxygen-free atmosphere to a temperature corresponding to a glass viscosity in the range 100 Pa.s to 100 kPa.s.

By excluding oxygen and heating the fibres to a temperature corresponding to a viscosity in the above range, we have unexpectedly found that optical couplers of fluoride glass may be produced with a reproducible coupling ratio, despite the rapid variation in viscosity with temperature, typically corresponding to a temperature range from 300° C. to 340° C. over the above viscosity range. Preferably the temperature employed corresponds to a glass viscosity in the range 1 kPa.s to 10 kPa.s. For a ZBLAN glass of composition Zn $F_4$—Ba $F_2$—$LaF_3$—$AlF_3$—NaF—$PbF_2$ the preferred temperature range is 323° C. plus or minus 3° C., more preferably plus or minus 1° C.

Preferably the temperature is monitored and is controlled by a feedback signal derived from the monitor's temperature. The monitor's temperature is preferably maintained constant at least during one stage of the method to within plus or minus 3° C., more preferably within plus or minus 1° C. Preferably the optic fibres are disposed closely adjacent a surface of a heated body so as to be maintained in thermal equilibrium therewith, the feedback signal being derived from the monitored temperature of the heated body.

The optic fibres may be composed of ZBLAN glass and may be heated to a temperature of 323° C. plus or minus 10° C. and are subsequently optionally cooled by between 1° C. and 2° C. prior to terminating heating. Preferably the tension applied to the optic fibres is controlled in dependence upon the extension of the fibres so as to maintain a stress in the optic fibres which is in the range $10^4$ Pa to $10^6$ Pa, more preferably in the range 0.5 times $10^5$ Pa to 1.5 times $10^5$ Pa.

The invention also includes within its scope optical couplers obtained by a method in accordance with the invention.

As well as excluding oxygen from the atmosphere surrounding the heated optic fibres, it is also desirable to exclude moisture. A variety of unreactive gases or vapours may be used to exclude oxygen, such as nitrogen, the inert gases, carbon dioxide, and heat-stable unreactive organic compounds such as halo-carbons, particularly fluorinated hydrocarbons. However it is undesirable to use hydrogen since this adversely affects the properties of fluoride glass.

Embodiments of the invention are described below by way of example only with reference to FIGS. 1 to 5 of the accompanying drawings, of which:

FIG. 3 is an underneath plan view of an alternative heater for use in the apparatus of FIG. 1;

FIG. 4 is a top plan view of the heater of FIG. 3, and

FIG. 5 is a schematic side elevation of a coupler formed by a method in accordance with the invention.

Figure 1:
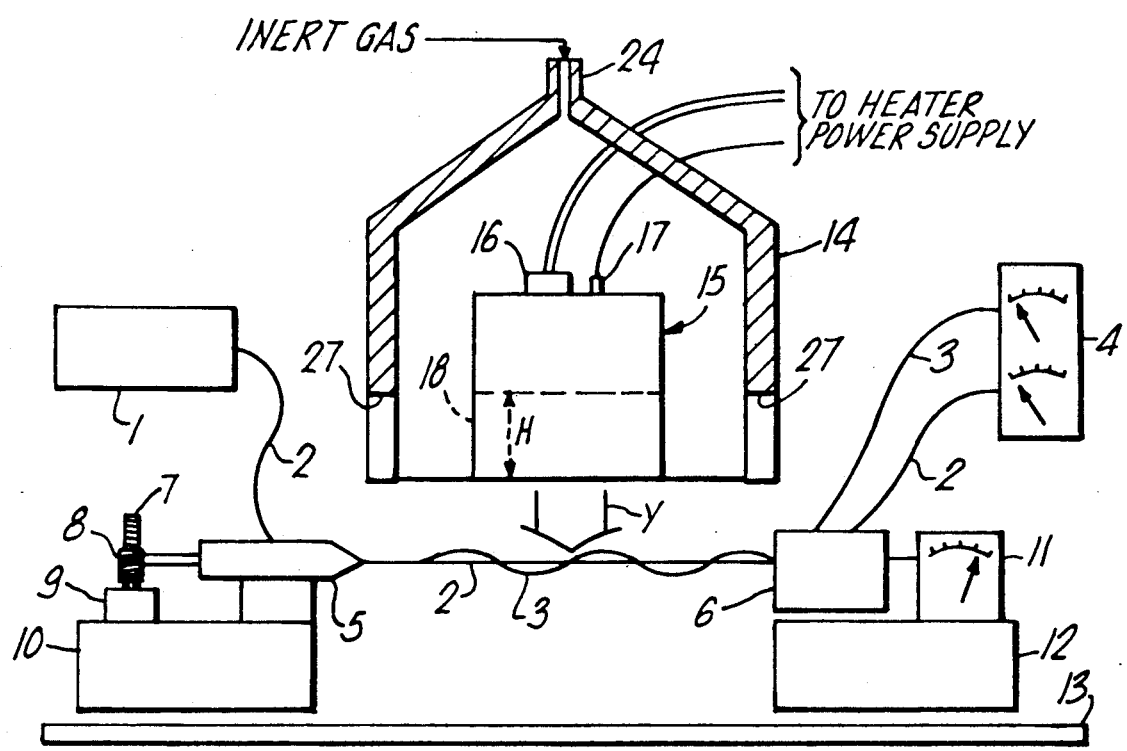
FIG. 1 is a schematic representation, partly in section, of apparatus for forming optical couplers by a method in accordance with the invention.
Figure 2:
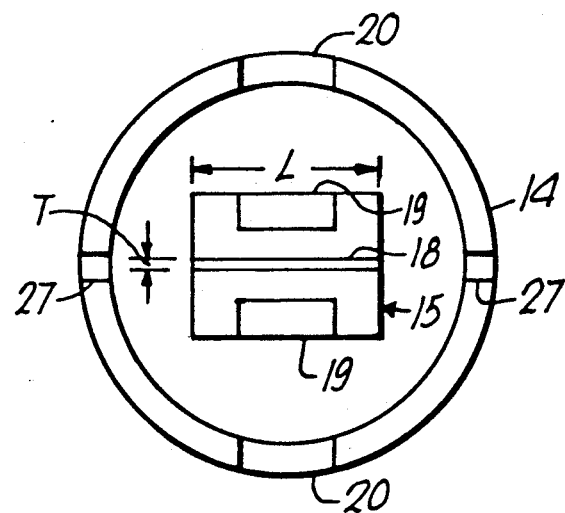
FIG. 2 is an underneath plan view of the heater and shroud shown in FIG. 1.

Referring to FIG. 1 the apparatus shown comprises an electric heater 15 which is located (by means not shown) within a shroud 14 through which inert gas such as nitrogen or argon for example at 0.1 bar is conducted through inlet 24 to provide the required oxygen-free atmosphere. The heater 15 incorporates a slot 18 which is also shown in FIG. 2 and the shroud 14 incorporates a slot 27, the height H of the slot 18 being sufficient to enable the heater and shroud assembly to be lowered over a twisted pair of optic fibres 2, 3 in the direction indicated by the arrow Y. In this condition the optic fibres are virtually enclosed by an oxygen-free atmosphere and are located within slot 18 but do not contact the sides thereof. In order to ensure that the optic fibres are in thermal equilibrium with the heater 15, the thickness T of the slot (as shown in FIG. 2) is suitably 0.75 mm.

As shown in FIG. 1, the optic fibres 2, 3 are tensioned between a holder 5 and a holder 6, the former being rotatable about its axis by a stepper motor 9 which drives it via wormwheel 8 and a gear 7. By this means the optic fibre 3 is twisted twice round the optic fibre 2 as shown schematically in FIG. 1. The stepper motor 9 and holder 5 are mounted on a common mounting 10 which is in turn movable on a base 13 in the direction of the tensioned optic fibres by a further stepper motor (not shown). The holder 6 is mounted on an air bearing (not shown) on a mounting 12 which is in turn mounted by a mechanical bearing (not shown) on base 13 and is movable towards and away from mounting 10 via a further stepper motor (not shown). The tension in the optic fibres 2, 3 is measured by a meter 11 which is mounted on mounting 12 and the stress, namely the tension divided by the cross sectional area of the optic fibres, is calculated by a computer (not shown) in dependence upon the original cross section of the optic fibres and the extension of the optic fibres (measured by means not shown) during the operation of the apparatus.

The arrangement shown in FIG. 1 is set up by splicing the optic fibre onto a laser 1 of the same wavelength as that at which the finished coupler is to operate. A length of free fibre is then prepared for coupling by removing the primary coating and cleaning thoroughly using propanol. The output from that fibre 3 is then calibrated as being 100% power. This length of fibre 3 is broken off and mounted between holders 5 and 6 ready for coupling. A second length 2 of fibre is then prepared identically but once mounted between holders 5 and 6 remains energised by laser 1 and the output ends of both fibres are inserted into the dual measuring heads of power monitoring equipment 4. As shown in FIG. 1, two turns are applied to the optic fibre 2 and 3 by the rotatable holder 5.

The heater block 15 is then heated by an electric cartridge heater 16 until its temperature as monitored by a thermocouple 17 which extends to a position closely adjacent the walls of slot 18 reaches a temperature of 320° C. This temperature is maintained by a "eurotherm" power controller in dependence upon a feedback signal from the thermocouple 17 in order to control the temperature to the required degree of accuracy. The stepper motors (not shown) are then turned on to pull apart the holders 5 and 6 and maintain a stress of $10^5$ Pa in the fibres, corresponding to a tension of 1.25 grammes (0.0123N) for 140 micrometre OD optic fibres. Pulling of the fibres is then maintained until the appropriate coupling ratio, as recorded by the measuring equipment 4, is reached.

The length L of the heater block 15 is suitably approximately 10 millimeters. Recesses 19 are provided in the heater block and recesses at 20 are provided in the shroud 14 in order to enable the heater 15 and shroud to be accurately located.

When the desired coupling ratio is achieved and the pulling is terminated, the heater 15 and shroud 14 are lifted from the partially fused optic fibres 2 and 3 (which are suitably multimode fibres) and the coupled region is then packaged in a channel 26 (FIG. 5) of a block 28 of either flint glass or float glass with a similar coefficient of thermal expansion to that of the fluoride fibres, thus giving mechanical strength and thermal stability to the optical coupler 29 formed thereby. As shown in FIG. 5, the coupled fibres 2 and 3 are embedded in channel 26 with epoxy resin.

FIGS. 3 and 4 show an alternative heater in which the nitrogen or other oxygen-free gas is directed through the heater block 15' via an inlet 24' and exits from an outlet 23 which is formed at the base of a central waisted portion of a slot 18' which is otherwise similar to the slot 18 shown in FIGS. 1 and 2. Accordingly the shroud 14 shown in FIGS. 1 and 2 may be dispensed with in this embodiment. The heater block 15' is sandwiched between end cheeks 21 of PTFE and communicates with recesses 22 formed in these end cheeks which are adapted to be located on locating supports (not shown). Two cartridge heaters 25 extend downwardly into the heater block 15' as shown in FIG. 4 and lie on opposite sides of slot 18'. A thermocouple 26 extends downwardly through the heater block 15' to a position closely adjacent the walls of the slot 18'. This heater arrangement may be controlled by a suitable power supply in dependence upon a feedback signal from the thermocouple 26. The width of the slot 18' (corresponding to the dimension T shown in FIG. 2) is suitably 0.75 mm. at the central waisted portion and the length (corresponding to the dimension L shown in FIG. 2) is suitably approximately 10 millimeters. The heater block 15' is suitably made of copper.

We claim:

1. A method of forming an optical coupler from two or more optic fibres having fluoride-glass cores comprising disposing the optic fibres along one another so as to bring their claddings into contact, tensioning and heating the optic fibres so as to fuse together at least the contacting portions of their claddings, said heating being performed in an oxygen-free atmosphere and at a temperature corresponding to a glass viscosity in the range 100 Pa.s to 100 kPa.s.

2. A method as in claim 1 wherein said temperature is sensed to provide a feedback signal and the heating is controlled by said feedback signal.

3. A method as in claim 2 wherein said temperature is maintained constant to within ±3° C. at least during the tensioning of the fibres.

4. A method as in claim 1 wherein said tension is controlled to maintain a predetermined value of stress on said optic fibres.

5. A method as in claim 1 wherein radiation is directed through the optic fibres during the heating and tensioning thereof, the coupling of said radiation between optic fibres is monitored and said heating and/or tensioning is terminated in response to the attainment of a predetermined coupling ratio.

6. A method as in claim 1 wherein said tension is maintained at a level sufficient to induce a stress in the optic fibres in the range $10^4$ Pa to $10^6$ Pa.

7. A method as in claim 6 wherein said stress is in the range of $0.5 \times 10^5$ Pa to $1.5 \times 10^5$ Pa.

8. A method as in claim 1 comprising the further step of packaging the coupled optic fibres in a protective medium.

9. A method of forming an optical coupler from two or more fluoride glass optic fibres comprising disposing the optic fibres along one another so as to bring their claddings into contact, tensioning and heating the optic fibres so as to fuse together at least the contacting portions of their claddings, said heating being performed in an oxygen-free atmosphere and at a temperature corresponding to a glass viscosity in the range 100 Pa.s to 100 kPa.s;

wherein said optic fibres are composed of ZBLAN glass and are heated to a temperature of 323° C.±10° C.

10. A method as in claim 9 wherein said optic fibres are cooled by between 1° C. and 2° C. prior to terminating the heating.

11. A method of forming an optical coupler from two or more fluoride glass optic fibres comprising disposing the optic fibres along one another to bring their claddings into contact, tensioning and heating the optic fibres to fuse together at least the contacting portions of their claddings, said heating being performed in an oxygen-free atmosphere at a temperature corresponding to a glass viscosity in the range 100 Pa.s to 100 kPa.s;

and wherein the heating of the optical fibres comprises heating a body, disposing said optical fibres adjacent a surface of the heated body so as to be maintained in thermal equilibrium therewith, the temperature of the heated body is sensed, and the heating of the body is controlled to maintain a predetermined value of said sensed temperature.

12. A method as in claim 11 wherein said optic fibres are disposed within a channel in said heated body.

13. A method for optically coupling optic fibres having fluoride-glass cores comprising:
   a. placing the fibres together such that a portion of the claddings of the fibres are in contact;
   b. applying a tensile force to the portions of the fibres in contact;
   c. heating the portion of the fibres in contact to a temperature corresponding to a glass viscosity in the range of 100 Pa.s to 100 kPa.s so that the fibres fuse together, and
   d. said heating step being performed in an oxygen-free atmosphere.

14. A method as in claim 13 further comprising the step of cooling the optic fibres before terminating the heating step.

15. A method as in claim 14 wherein said cooling is no more than 2° C. below said temperature corresponding to said glass viscosity.

16. A method as in claim 13 wherein the tensile force induces a stress in the fibers in the range of $10^4$Pa to $10^6$Pa.

17. A method as in claim 13 wherein said heating step is performed at a substantially-constant temperature during the tensioning of the fibers.

18. A method as in claim 13 further comprising the step of monitoring radiation through the fibers and terminating the heating and/or tensioning steps when a predetermined coupling ratio is attached.

19. A method for optically coupling fluoride glass optic fibres wherein the optic fibers are ZBLAN, said method comprising:
   a. placing the fibers together such that a portion of the claddings of the fibers are in contact;
   b. applying a tensile force to the portions of the fibers in contact;
   c. heating the portion of the fibers in contact to a temperature substantially within the range of 313° C. and 333° C. so that the fibers fuse together; and
   d. said heating step being performed in an oxygen-free atmosphere.

* * * * *